INVENTORS
HOLLIS C. GRUBB,
MILTON W. GARLAND and
MALCOLM C. SMITH

BY
ATTORNEYS

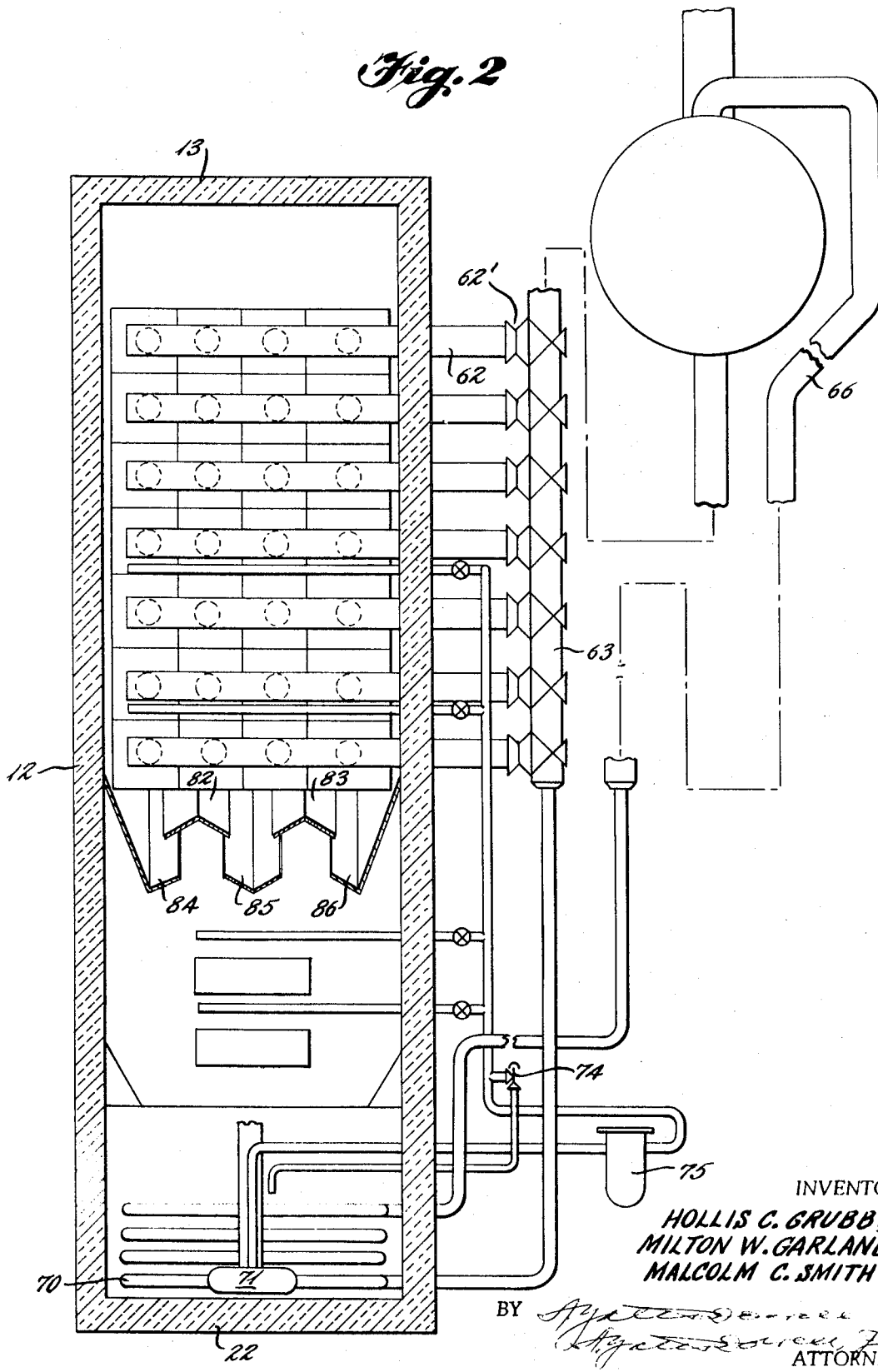

United States Patent Office 3,605,429
Patented Sept. 20, 1971

3,605,429
DIRECT REFRIGERANT FREEZING
Malcolm Clinton Smith, Hagerstown, Md., and Milton W. Garland, Waynesboro, and Hollis Charles Grubb, Chambersburg, Pa., assignors to Frick Company, Waynesboro, Pa.
Filed Nov. 4, 1969, Ser. No. 873,877
Int. Cl. F25d *17/02*
U.S. Cl. 62—64                                     6 Claims

ABSTRACT OF THE DISCLOSURE

Food or other product is introduced into an unsealed housing having an atmosphere of circulating refrigerant vapor which rises through a descending liquid refrigerant curtain and which is continuously condensed on refrigerated surfaces within the housing. After the exterior of the product is frozen, liquid refrigerant may be sprayed directly thereon. Prior to use the surfaces within the housing are cooled from the lowermost progressively upwardly thereby driving out air and reducing condensation of moisture; after use the procedure is reversed in order to permit substantially complete recovery of the refrigerant.

BACKGROUND OF THE INVENTION

Field of the invention

Figure 1:
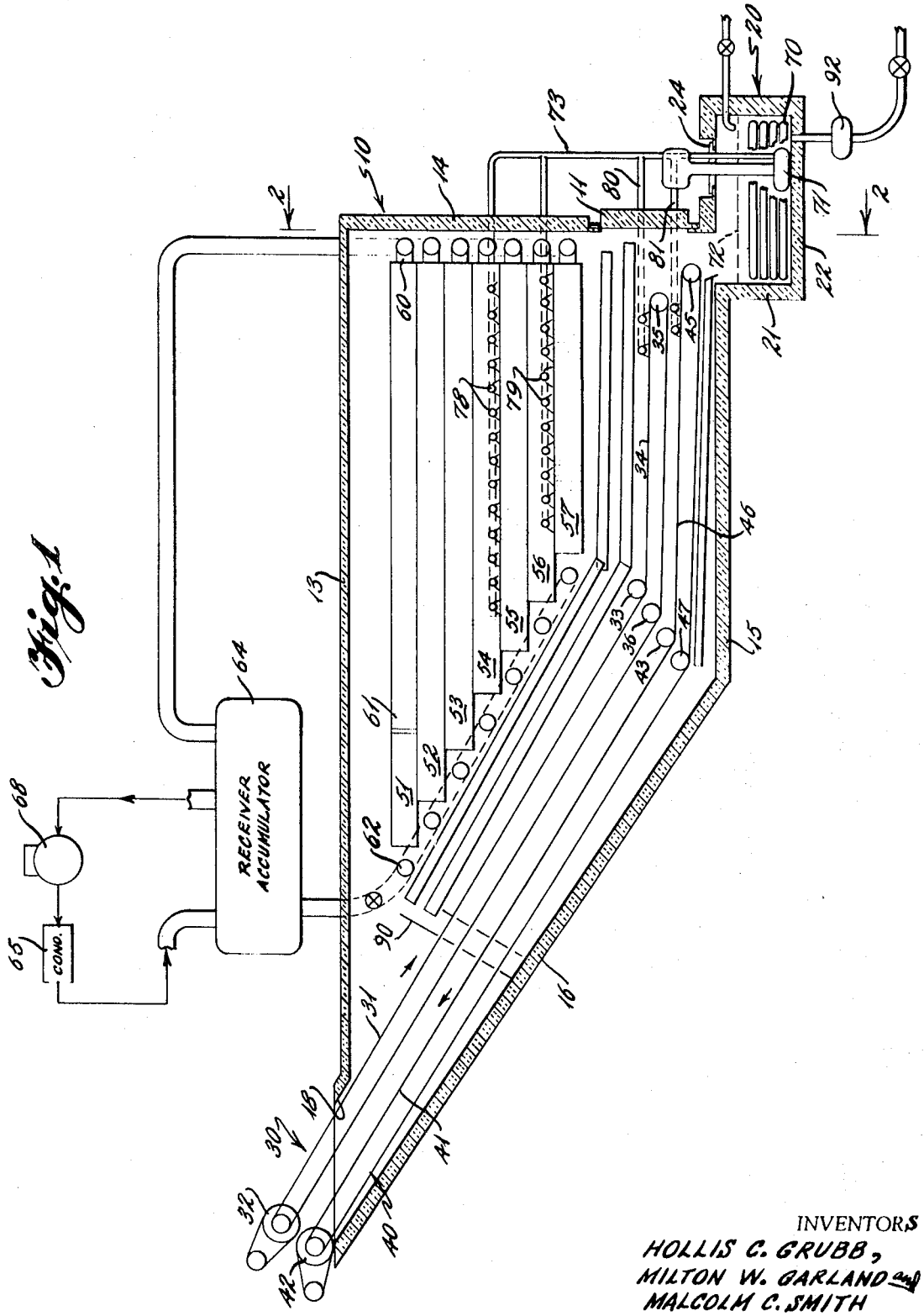

This invention pertains to refrigeration and more particularly to the freezing of products such as foods in relatively small pieces or units. Various items of food are processed including, but not limited to, beans, peas, strawberries, shrimp, fish fillets, meat and meat patties. Products that are breaded or similarly prepared may also be frozen.

The invention is concerned with the freezing of products economically and maintaining them in the best condition. The freezing of products requires consideration of and attention to their composition, texture, particle size and the like, so that the products are properly frozen without undesirable thermal shock, without changing the character of the product, dislodging or removing any coating that has been applied thereto, and without altering the taste.

Description of the prior art

Food products have been frozen heretofore by various procedures including immersion in a liquid refrigerant, spraying with liquid refrigerant, and subjecting the same to refrigerated air either moving in a stream or relatively still. These procedures have certain drawbacks. The immersion in a liquid refrigerant of the spraying of products with liquid refrigerant may produce thermal shock resulting in cracking or injuring the product. It also may erode or remove any coating that has been applied. Subjection to refrigerated air either moving or still has drawbacks such as possibility of slow or uneven freezing or excessive drying of the product.

Many prior art systems require the use of a sealed housing at other than atmospheric pressure, presenting problems in maintenance, cleaning, and undesired loss of refrigerant.

SUMMARY OF THE INVENTION

The present invention provides for the controlled removal of heat from the product without exposing it to eroding forces, at least until the outer surface of the product is sufficiently frozen to resist such forces. The refrigerant employed that is presently accepted by the U.S. Food and Drug Administration is dichlorodifluoromethane, otherwise known as R12. Other refrigerants of similar nature may be employed provided that approval of public health authorities is obtained. The refrigerant is well known, having a boiling point at atmospheric pressure of approximately —22° F. Because of its relatively low boiling point, all traces of it may be removed from the product while it is within the freezer and the refrigerant recovered for subsequent use and without loss to the atmosphere.

Applicant's invention includes the freezing of a product at atmospheric pressure within a housing in which the refrigerant in its liquid phase is circulated by a pump and in which its vapors are recirculated due to the differences in specific gravity or stratification. Such thermal flow is promoted by providing refrigerated surfaces which are below the saturation temperature of the refrigerant at atmospheric pressure. The condensing surfaces are maintained by a secondary refrigeration system independently of the refrigerant within the housing.

DETAILED DESCRIPTION OF THE INVENTION

The present invention will be further described in conjunction with drawings in which FIG. 1 is a schematic longitudinal section of the housing employed, and FIG. 2 is a section on the line 2—2 of FIG. 1.

The present invention includes a housing 10 having insulated walls and one or more access openings 11. In the preferred embodiment the housing has side walls 12, a top wall 13, an end wall 14, a main bottom wall 15 and an inclined bottom wall 16. Wall 13 is at the level of the uppermost portion of wall 16 but terminates inwardly of the housing in order to provide a space 18 through which the product is received and discharged.

At its other end the housing has at its lowermost portion a sump portion 20 having side walls 21 and bottom wall 22. The sump 20 forms a continuation of the main housing portion 10 having insulation and an access opening 24 as desired.

By constructing the main housing 10 as described, conveyers may extend on an incline through the opening 18 just above the wall 16 until they reach the desired level in the housing at which point they become horizontal. Furthermore, the housing naturally provides for larger volume in the upper portion, progressively increasing at upper levels in accordance with the expansion of vapors and increased surface area of condensing coils within the housing.

In order to convey the product into the housing, a first conveyer belt 30 is provided having an inclined entering run 31 and which passes over sheave or pulley means 32 outside of the housing and guide means 33 at the lower part of the housing which changes its position to a horizontal run 34. The belt then passes over an end sheave 35 for return to guide 36 and back to outside sheave 32.

A product discharge belt 40 similarly has an inclined discharging run 41, an outer support sheave 42, a guide means 43 at the lower portion of the housing, a sheave 45 arranged to provide a horizontal portion 46 for the belt, and a return sheave 47. Sheave 45 is positioned beyond the sheave 35 in order that product from the belt 34 will drop onto belt 46.

The belts are preferably individually controlled to assure retention of the product.

Mounted at an elevation within the housing and above the belts 30 and 40 are a series of condensing coils which constitute the evaporator of a secondary refrigeration system. These condensing coils are several in number and identified as numbers 51, 52, 53, 54, 55, 56 and 57. The uppermost coil 51 is the longest, the others being progressively shorter at the progressively lower levels within the housing.

The coils may be of various types, those illustrated having the usual inner pipes 60 surrounded by fins 61 which are attached thereto. While rectangular fins on rounded pipes, horizontally disposed, are illustrated, any heat transfer surfaces of a space and capacity capable of transferring the refrigerated load may be employed. Similarly, the number and arrangement of the coils may vary provided that the principle of the invention is carried out.

The coils 51–57, form part of a secondary system, and are connected by branches 62 to a header 63 which supplies refrigerant from a receiver accumulator 64 connected to a condenser 65. A valve 62′ is provided for each line to permit individual operation. At the other end, a return line 66 removes vapor from the interior of the coils 51–57 into the space in the upper portion of the receiver accumulator 64 connected to suction line 67 to compressor 68.

The refrigeration system which supplies the coils 51–57 also supplies refrigerant to coils 70 positioned at the lower portion of the sump 20.

The sump has a pump 71 which pumps liquid 72 from the sump through pipes 73 at a controlled pressure maintained by relief 74 and delivers refrigerant through a filter 75 to cross headers 78, 79, 80 and 81 which extend into the housing 10.

The lower cross headers 80 and 81 preferably extend only sufficiently into the housing to overlie the end portions of the belts 34 and 46.

The upper cross headers 78 and 79 are positioned, collectively, over coils 55, 56, 57 in the lower portion of the housing but do not discharge onto the belts 30 and 40 because of baffles which will be described.

In order to avoid the dripping of condensate from the coils 51–57 and the discharge from cross headers 78, 79 onto belts 30 and 40, a series of baffles are arranged over the belts. As indicated in FIG. 2, the baffles include an upper downwardly opened series 82 and 83 which discharge onto a lower series of baffles 84, 85 and 86 which face upwardly, forming a drain gutter. The baffles are inclined longitudinally toward the end of the housing having the sump in order that liquid collected thereon will be discharged over the ends and into the sump.

OPERATION

In considering the operation it should be borne in mind that the purposes include avoiding loss of the refrigerant, avoiding condensation of moisture from the atmosphere within the housing and especially onto the coils 51–57, avoiding thermal shock to the product and controlling the direct application of liquid onto the product.

In starting operation, the refrigerant from the secondary system is introduced initially into the lowermost coil 57, only. Then freezer refrigerant is slowly charged into the sump 20 until it has attained a sufficient level for the commencement of operation. Refrigerant from the secondary system is then introduced into the next succeeding uppermost coils until all of the coils are charged. The foregoing procedure results in the release gradually from the bottom of the housing of refrigerant vapor which being colder than air, and therefore heavier, gradually forces the latter upwardly out of the housing with little or no condensation or moisture from the air onto the coils and other surfaces within the housing. The apparatus is then ready to receive the product to be frozen.

Pump 71 is operated to spray refrigerant over the lower coils and any desired portion of the conveyers 30 and 40. Except for the spray from headers 80 and 81, no liquid is discharged onto the products. These headers are valve isolated and in certain systems spray may be dispensed with depending upon the nature of the product and the refrigerating load.

The product is placed on the run 31 of the conveyer 30 and moved downwardly along the incline until it reaches the horizontal portion 34. Due to stratification of the atmosphere within the housing the product is subjected to the warmer atmosphere initially, and to gradually cooler vapor as it descends. The product warms the atmosphere surrounding it causing it to rise into contact with the coils 51–57 onto which it condenses. Thus there is a constant circulation of warmer vapors rising and condensing liquid descending within the housing.

As the product progresses downwardly into the freezer housing it is exposed to the denser fog-like atmosphere. As its outer surface becomes frozen the rate of heat removal decreases, thereby decreasing the rate of heating of the refrigerant. Thus when it is exposed to the spray from the headers 80 and 81 the release of vapor from the direct liquid contact is substantially less than would occur if the liquid were sprayed onto a warmer or unfrozen product. By the time the product reaches the spray headers 80 and 81 it is sufficiently frozen and any coating sufficiently fixed thereto to resist separation. After passing through the spray from the headers 80 and 81 the product is discharged by the conveyer 40.

In order to reduce the possible transfer of refrigerant vapor out of the housing, a series of baffles 90 are mounted transversely of the conveyers adjacent to the upper ends of the baffles. These may be of rigid or ribbon-like flexible material as desired.

When the product freezing operation is discontinued it is desirable that the refrigerant be recovered with minimum loss. This is carried out by initially cutting off the supply of refrigerant to the coils 51–54 which are above the cross headers 78, 79. These coil surfaces now become warm and the refrigerant which has condensed on them will evaporate and condense on the colder surfaces below due to the lower vapor pressure within the lower portion of the housing. The circulation of the refrigerant by the pump 71 is then discontinued following which the refrigeration of the coils 55–57 is discontinued. This causes a progressive transfer of the refrigerant onto the sump 20 from which it may be drained by a transfer pump 92.

What is claimed is:

1. The method of recovering liquid refrigerant within a housing which is open to atmosphere from refrigerated surfaces on which the refrigerant has condensed, comprising maintaining a supply of subcooled refrigerant at a level below the refrigerated surfaces, and seriatim, discontinuing the refrigeration of the surfaces at an upper level within the housing while continuing it at a lower level, thereby causing the condensed refrigerant at the upper level to evaporate and to condense onto surfaces at a lower level, and discontinuing the refrigeration of surfaces at the lower level thereby causing the condensed refrigerant at the lower level to evaporate and to condense onto the subcooled liquid refrigerant supply, and recovering the liquid refrigerant from the supply.

2. The method of freezing a product within a chamber open to the atmosphere at its upper portion, comprising the steps of: introducing the product into the chamber through the open portion, conveying the product at a controlled rate along the lower portion of said chamber, maintaining a supply of vaporizable liquid refrigerant within the chamber at a level below the product, said liquid refrigerant vaporizing so that refrigerant vapor rises upwardly through the conveying means to extract heat from the product, maintaining extended surfaces in the chamber at an elevation above the product which is at the lower portion and at a temperature below that at which the vaporized refrigerant condenses, condensing the vapor on said surfaces, discharging liquid refrigerant from said supply onto at least certain of said surfaces in counterflow relation to the rising vapor to remove condensed vapor from said surfaces, collecting liquid refrigerant descending from said surfaces, and returning the frozen product to the upper portion of said chamber for discharge, whereby refrigerant vapors from said supply absorb heat from the product after which the vapors are condensed on said extended surfaces and returned to said supply by the counterflowing liquid refrigerant while the product being frozen is subjected to the circulating refrigerant vapor.

3. The invention as defined in claim 2, and spraying liquid refrigerant onto the product after the product has been subjected to the refrigerant vapor sufficiently to freeze its exterior.

4. Apparatus for direct refrigerant freezing of a product comprising a housing having a passageway normally open to atmosphere, means for conveying the product through the passageway and along a low elevation within said housing, means for storing vaporizable liquid refrigerant within the housing beneath said low elevation of the conveying means so that refrigerant vapor rises through said conveying means in heat exchange relationship with the product, extended refrigerated surfaces located in said housing above the low elevation of said conveying means for condensing refrigerant vapors, means for discharging liquid refrigerant from the liquid storing means onto at least certain of said extended surfaces to remove condensed vapor therefrom, means for returning liquid refrigerant to said liquid storing means, and spray means for spraying liquid refrigerant onto the product after the exterior of the product has been frozen by the refrigerant vapor.

5. The invention as defined in claim 4 in which the extended refrigerated surfaces are at various levels, and the surface area increases step by step from a lower to an upper level.

6. The invention as defined in claim 4, and a secondary refrigeration system, said extended refrigerated surfaces being supplied with refrigerant from the secondary system through a common header, and means for individually controlling the flow to portions of the extended refrigerated surfaces.

References Cited
UNITED STATES PATENTS

| | | | |
|---|---|---|---|
| 3,368,363 | 2/1968 | Alaburda et al. | 62—64 |
| 3,486,345 | 12/1969 | Waldin | 62—375 |

MEYER PERLIN, Primary Examiner

R. C. CAPOSSELA, Assistant Examiner

U.S. Cl. X.R.

62—119; 375